J. L. GRAHAM.
Plows
No. 145,862. Patented Dec. 23, 1873.
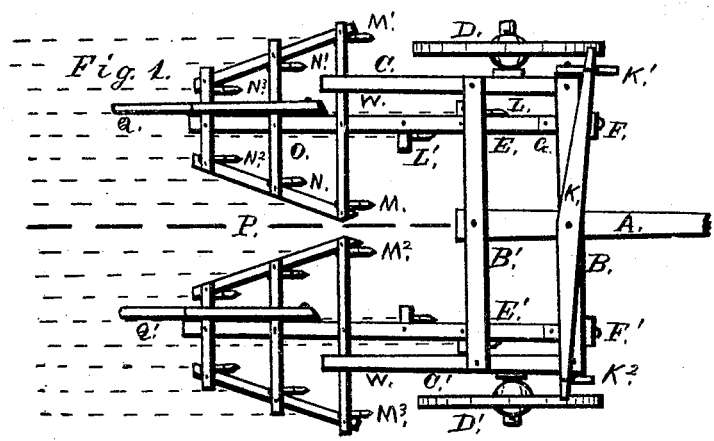
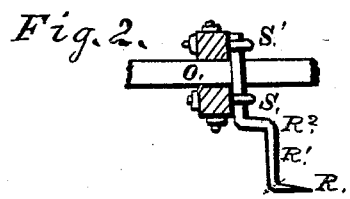
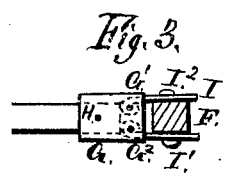
Witness:
F. M. Tate
S. T. Marshall
Inventor:
John Lindsey Graham.
By Saml. J. Wallace.
Attorney.

UNITED STATES PATENT OFFICE.

JOHN LINDSEY GRAHAM, OF CARTHAGE, ILLINOIS.

IMPROVEMENT IN PLOWS.

Specification forming part of Letters Patent No. 145,862, dated December 23, 1873; application filed January 27, 1873.

*To all whom it may concern:*

Be it known that I, JOHN LINDSEY GRAHAM, of Carthage, Illinois, have invented a new and useful Improvement in Plows, &c., of which the following is a specification:

This invention relates to cultivators for corn and other plants; and consists of the features made as hereinafter set forth, referring to the accompanying drawings, in which—

Figure 1 is a top view or plan of the machine; and Fig. 2 is a side view of a portion of the same. Fig. 3 is a view of the joint.

This invention belongs to the class of cultivators designed to act on both sides of a row at one passage. To the tongue A, between the horses, is attached a frame, B B', having side parts C C', which bear wheels D D', on which the weight rests. To the part B, at a point in front of the wheels, the ends of the plow-beams E E' are attached by means of pendants F F', adjustable in height and position. The beams are attached to the pendants by means of double hinge-joints, that give free lateral and vertical motion. These joints are made of a top and bottom piece, like G, to clasp the end of the plow-beam. They are fastened thereto by the bolt H, acting as a pivot for the beam. These parts G are connected together by bolts $G^1$ $G^2$, and around these are bent the ends of parts I I', which project forward, clasping the pendant F, Fig. 3, to which they are secured by the bolt $I^2$, acting as a hinge for the vertical motion. The tongue and frame B B' are elevated to pass over the row of plants, and an evener, K, is pivoted to the tongue in the center. At the sides, parts $K^1$ $K^2$ descend, by the side of parts C C', to a suitable height, and the horses are attached to their lower ends. These parts $K^1$ $K^2$ are pivoted to parts C C' in their centers, and are attached to part K by links at their upper ends, so as to complete the evener. The beam E bears eight teeth or small plows, arranged as shown, to cut the soil finely in cultivation. Two of them, C C', are arranged forward, on each side of the beam. The others, M M' N $N^1$ $N^2$ $N^3$, are arranged back of them, on a frame, O, on each side of the beam. The tooth M is arranged to run close to a row of plants on the line P, and others follow at successive distances. The tooth M' runs near the middle, between two rows, and just back of, or outside of, the line of the wheels, the arrangement of the whole being such as to thoroughly pulverize the whole space, and that the clogging up of one will not unduly help in clogging the others. The beam is guided by the handle Q. The teeth are made of a shape to do good work and avoid clogging. The plow point or shoe R projects forward from the upright part $R^1$, to enter the soil. The tooth has a backward bend, $R^2$, to throw off trash, and avoid clogging before reaching the frame O, to which it is attached. It is fastened, by bolts S S', at the bottom and top of the frame.

If the tooth is inclined to run too deep, a wedge is put behind the tooth at the bottom; if too shallow, the wedge is put in at the top.

I claim—

1. The teeth R $R^1$ $R^2$, constructed in the form shown, and attached to the frame by bolts S S', arranged as and for the purpose specified.

2. The beam E, provided with the teeth L L', and the frame O, provided with the teeth R $R^1$ $R^2$, all constructed and arranged for operation as and for the purpose set forth.

JOHN LINDSEY GRAHAM.

Witnesses:
SAML. J. WALLACE,
R. M. MARSHALL.